United States Patent [19]

DeJovine

[11] 4,144,166

[45] Mar. 13, 1979

[54] COMPOSITIONS, APPARATUS AND METHODS USEFUL FOR RELEASING SOLID LUBRICATING OIL ADDITIVE

[75] Inventor: James M. DeJovine, Homewood, Ill.

[73] Assignee: Atlantic Richfield Company, Philadelphia, Pa.

[21] Appl. No.: 780,900

[22] Filed: Mar. 24, 1977

[51] Int. Cl.² .............................................. C10M 11/00
[52] U.S. Cl. ..................................... 210/60; 208/180; 252/10
[58] Field of Search ............... 210/167, 168, 199, 206, 210/501, 502, 506, 509, 59, 60; 252/9–12, 25, 29, 56, 59; 23/267, 272; 208/179, 180

[56] References Cited

U.S. PATENT DOCUMENTS

| 2,785,805 | 3/1957 | Hough | 210/169 |
|---|---|---|---|
| 3,336,223 | 8/1967 | Kneeland | 252/9 |
| 3,715,037 | 2/1973 | Hu et al. | 210/501 |
| 3,749,247 | 7/1973 | Rohde | 210/501 |

Primary Examiner—Ferris H. Lander
Attorney, Agent, or Firm—Stanley M. Welsh; Frank J. Uxa

[57] ABSTRACT

Improved internal combustion engine lubrication is obtained by the controlled rate of release of certain solid particles into circulating lubricating oil. Compositions are set forth comprising such solid particles combined with solid thermoplastic polymer having a controlled rate of dissolution in the lubricating oil. Also included are methods and apparatus wherein such solid particles are added to the engine lubricating oil, for example, which involve the filtering system for such oils.

5 Claims, 4 Drawing Figures

COMPOSITIONS, APPARATUS AND METHODS USEFUL FOR RELEASING SOLID LUBRICATING OIL ADDITIVE

This invention relates to improved apparatus and methods for lubrication of internal combustion engines. More particularly, this invention relates to such apparatus and methods involving lubricating oil compositions which include solid materials to enhance the properties of such compositions.

Oil compositions are conventionally used to lubricate internal combustion engines, for example, such engines which power motor vehicles. Previous studies have indicated that the inclusion of certain solid materials, e.g., graphite, in these oil compositions improves the engine's fuel efficiency. For example, studies reported in "Stable Colloid Additives For Engine Oils — Potential Improvement in Fuel Economy", James E. Bennington et al, Society of Automotive Engineers, Fuels and Lubricants Meeting, Houston, Tex., June 3–5, 1975, indicate that a gasoline mileage improvement of between 3 to 5 percent is obtained by adding one percent graphite to a conventional lubricating oil composition. Such improvement in fuel economy is particularly valuable in view of, for example, the short supply of such fuels.

However, certain problems may arise using solid particles-containing lubricating oil compositions. For example, after a period of use, the solid particles often tend to agglomerate into much bigger particles which then may be removed from the composition by oil filters which are conventionally present in internal combustion engine lubricating oil systems. Therefore, means to replenish the concentration of properly sized solid particles in such compositions are clearly advantageous. In addition, since many lubricating oil compositions do not contain the beneficial solid particles noted above, it would be advantageous to provide means for adding such solid particles to a lubricating oil composition, e.g., to obtain the improved fuel economy associated with solid particles-containing lubricating oil compositions.

Therefore, one object of the present invention is to provide an improved apparatus and method for adding solid particles to a lubricating oil composition.

Another object of the present invention is to provide an improved apparatus and method for filtering a lubricating oil composition, e.g., used to lubricate an internal combustion engine.

Another object of this invention is to provide a composition containing solid particles and thermoplastic polymer having a controlled rate of dissolution in lubricating an oil composition.

A still further object of the invention is to provide an improved method of lubricating an internal combustion engine. Other objects and advantages of the present invention will become apparent hereinafter.

It has now been found that improved internal combustion engine lubrication is obtained by the controlled rate of addition of certain solid particles into the circulating lubricating oil of the internal combustion engine. Thus, in one embodiment, the present invention involves a composition comprising such solid particles combined with a solid thermoplastic polymer having a controlled rate of dissolution in a lubricating oil.

In another embodiment, the solid particles to be added to the circulating lubricating oil of an internal combustion engine are associated with the filtering system for such circulating lubricating oil. In this embodiment, the present invention involves an apparatus for filtering solid contaminants from a circulating lubricating oil composition comprising:

1. chamber means having an oil inlet means through which the circulating lubricating oil enters the chamber and an oil outlet means through which the circulating lubricating oil exits the chamber;
2. filter means located in the chamber means to remove at least a portion of the solid contaminants from the circulating lubricating oil composition as the composition flows through the chamber; and
3. solid particles-containing means located in the chamber to provide solid particles to at least a portion of the circulating lubricating oil flowing through the chamber; the solid particles acting to maintain or improve the quality of said lubricating oil composition when included in the lubricating oil composition and the solid particles having sizes sufficiently small to substantially avoid being removed from the lubricating oil composition by the filter means.

For example, solid particles compounded with a solid thermoplastic polymer can be included in the filtering apparatus as the solid particles-containing means. Alternately, the solid particles can be placed on the filter means, e.g., element, to be picked up by the circulating oil. In an additional preferred alternative, the solid particles-containing means can be a liquid suspension or colloid so that the solid particles are picked-up by the circulating oil. This latter embodiment is especially preferred when the quality of the circulating oil is to be improved, rather than maintained, by the addition of solid particles. For example, this embodiment may be advantageously employed when the bulk of the circulating oil is substantially free of such solid particles prior to being passed through the present filtering apparatus.

In one preferred embodiment of this invention, a lubricating oil, circulated through an oil circulation system of an internal combustion engine, contacts a solid particles-containing means comprising solid thermoplastic polymer containing the solid particles effective to maintain or improve the lubricating quality of the engine lubricating oil composition and/or a liquid suspension or colloid containing such solid particles. This may be readily achieved by depositing (1) a composition comprised of a solid thermoplastic polymer having a controlled rate of dissolution in the oil, this composition hereinafter referred to for convenience as the polymer-solid particles composition, and/or (2) an amount of liquid or colloid containing solid particles suspended therein, hereinafter referred to as the solid particles suspension, in a device comprised of a chamber having oil inlet means and oil outlet means and circulating at least a portion of the oil through the chamber for contact with the polymer-solid particles composition and/or the solid particles suspension. The size, shape, weight and the like of the present solid particles-containing means are not critical and may be varied over a wide range. For example, this means may weigh in the range of about 10 grams to about 10,000 grams or more depending on the particular application, e.g., engine involved.

As the oil contacts the polymer-solid particles additive composition or solid particles suspension, the solid particles which are compounded in the composition or suspension are added into the oil, generally in a dispersed or colloidal suspension with the circulating lubricating oil composition. In the instance where a polymer-solid particles additive composition is employed, the polymer acts as the carrying medium for the solid particles. Accordingly, the polymer should be a thermoplastic polymer having a controlled rate of dissolution in oil, and be of a sufficiently high molecular weight so that the polymer and, consequently the polymer-solid particles composition, is solid, i.e., range in viscosity from a plastic-solid to solid at the temperature of oil contact. Polymers which have a controlled rate of dissolution in oil include polymers which are relatively oil-insoluble or relatively non-dispersible in oil and polymers which although highly oil soluble or highly oil dispersible go into solution with difficulty, e.g., it is necessary that they be agitated in the presence of the oil for a relatively long period of time before going into the solution.

Virtually any polymer that has these properties may be used in the practice of this invention such as, for example, ethylene-propylene copolymers having molecular weights in the range of about 200,000 to 300,000; polypropylene oxide having a molecular weight of about 500,000; and ethylene-vinyl acetate copolymer having a molecular weight in the range of about 200,000 to 300,000. It should be understood that the polymer utilized may improve to some extent the beneficial viscosity properites of the oil and/or impart at least one other beneficial property to the oil. For instance, many of the presently useful polymeric materials may act as detergents, oxidation inhibitors, extreme pressure additive, etc. in lubricating oil compositions. Use of these type polymers provides still additional benefits to the polymer solid-particles containing composition. Exemplary polymers of this type are the polymethacrylates and the polyalkylmethacrylates wherein the alkyl group contains 1 to about 20 carbon atoms. These polymers often have molecular weights in the range of about 200,000 to about 1,500,000 or more. In addition, copolymers obtained by polymerizing a alkyl methacrylate such as tetradecyl methacrylate with a vinyl pyridine such as 2-vinylpyridine can also be used. One particularly preferred co-polymer is derived from the polymerization of (1) an N-vinyl pyrrolidone and (2) an oil soluble acrylic ester. Such co-polymers will be discussed in detail hereinafter. Polystyrene having molecular weights in the range of about 30,000 to 50,000 and copolymers obtained by polymerizing propylene with a $C_{10}$ to $C_{24}$ monoolefin and having molecular weights in the range of about 50,000 to 150,000 are further examples of suitable polymers. Polyisobutylene having molecular weights in the range of about 80,000 to 135,000 is still another example of a preferred polymer. Additional examples of polymers are the partially hydrogenated block polymers formed from the polymerization of styrene and a conjugated diene having 4 to 5 carbon atoms, such as 1,3-butadiene and/or isoprene.

It should be understood of course that polymer selection will depend on the system in which it is used because of the different operating temperatures of different engines. As stated hereinbefore the polymer should be thermoplastic solid or solid mass and have a controlled rate of dissolution in oil at the temperatures of oil contact. Consequently there may be selected a higher molecular weight polymer having a lower rate of dissolution in oil for a polymer-solid particles-containing additive composition utilized in the oil circulation system of engines operating under high severity temperature and load conditions that would be selected for utilization in a normal system such as a conventional automobile engine which operates at a lower average temperature.

The presently useful polymer-solid particles-containing composition may include a plurality of polymers, for example, each with a different rate of dissolution in the circulating oil and with a differnt concentration of solid particles. For example, it may be desired to rapidly add an initial amount of solid particles to the circulating oil system and, afterwards, maintain the concentration by a slow addition. In this instance, the polymer-solid particles-containing composition may comprise a first portion which contains a large amount of solid particles and/or a polymer which has a high rate of dissolution in the circulating oil system and a second portion which as a smaller amount of solid particles and/or a polymer which has a slower rate of dissolution. Thus, as the oil initially contacts the composition, the first portion provides an initial increase in the concentration of solid particles present in the circulating oil. After at least part of the first portion is dispersed into the oil, the second portion of the composition acts to maintain the composition of solid particles by slowly adding solid particles to the circulating oil system. The first and second portions of the composition may be arranged in any convenient manner. For example, the first and second portion may be layered. Alternately, the first portion may act as at least a partial coating on the second portion. Selection of the polymers from the first and second portions should follow the same general criteria noted above regarding rapid and slow dispersancy in the circulating oil system.

The proportion of polymer that comprises the polymer-solid particles composition will depend on the rate at which it is desired to have the solid particles fed into the oil. Thus, the higher the proportion of polymer in the polymer-solid particles composition, the slower the rate of solid particles addition.

The presently useful solid particles include those particles which are effective to improve the lubricating properties of internal combustion engine lubricating oil compositions. Such solid particles are sized sufficiently small to substantially avoid being removed from the lubricating oil composition by filter means used to remove solid contaminants from the composition. Preferably, a major portion, by weight and more preferably, substantially all, of such solid particles, have a maximum transverse dimension in the range of about 1 millimicrons to about 2 microns, and most preferably in the range of about 1 millimicron to about 500 millimicrons. Suitable solid particles for use in the present invention include those materials known to provide improved lubricating properties to lubricating oil compositions. Such solid particles include, for example, graphite, molybdenum disulfide, zinc oxide, tungsten disulfide, mica, boron nitride, borax, silver sulfate, cadmium iodide, lead iodide, barium fluoride, tin sulfide, mixtures thereof and the like. The solid particles useful in the present compositions are preferably selected from the group consisting of graphite, molybdenum disulfide, zinc oxide, and mixtures thereof; more preferably from the group consisting of graphite, molybdenum disulfide and mixtures thereof; and most preferably, graphite.

The solid particles are preferably present in the present polymer-solid particles-containing compositions in an amount of about 0.05% to about 50% more preferably about 1% to about 30% by weight of the total polymer-solid particles composition. In the embodiment of the present polymer-solid particles-containing compositions which comprises at least two different portions, the first portion preferably includes about 5% to about 50% by weight of solid particles and the second portion preferably includes about 0.01% to about 30% by weight of solid particles. In this embodiment, the first portion preferably comprises about 10% to about 90% of the total polymer-solid particles-containing composition, which the second portion preferably comprises about 90% to about 10% of the total composition.

The solid particles suspension component of the present invention often involves such solid particles as a colloidal suspension in, for example, a conventional lubricating oil and/or at least one conventional lubricating oil detergent. For example, such colloidal suspension may contain about 1% to about 50%, and preferably about 5% to about 30% by weight of such solid particles. Preferably, the solid particles suspension component contains about 1% to about 50%, more preferably about 3% to about 30%, by weight of at least one lubricating oil detergent.

Any conventional lubricating oil detergent may be included in these suspensions. Such detergents are often characterized as comprising at least one surface active compound which, when included in a lubricating oil composition tends to inhibit solid contaminants, e.g., combustion by-product present in the engine's lubricating oil, from adhering to metallic surfaces of engine components. Although both ash-containing, metal-based detergents and ashless detergents are useful in such solid particles-containing suspensions, the ashless detergents are preferred.

There are many examples of ash-containing, metal-based detergents which are suitable in such solid particles-containing suspensions. The ashless detergents preferred for use are compounds which comprise an oil-solubilizing tail and a polar detergent head. Many ashless detergents fitting this general description are known to the art and are commercially available.

Specific examples of this type of ashless detergent include the polyamino-polyalkylene alkenyl succinimides and the N-dialkylaminoalkyl alkenyl succinimides. Amine salts of alkyl phosphoric acids, are also suitable. Polyamine derivatives of long chained hydrocarbons may also be used. Reaction products of alkylene polyamines with long chained alkenyl succinic anhydrides and long chained esters of Mannich bases are suitable detergents. As can be seen, the required polarity may be supplied by groups containing, for example, oxygen, sulfur, phosphorous, nitrogen and mixtures thereof. All of these suitable ashless detergents may be generally characterized as compounds comprising at least one substantially hydrocarbon portion of sufficient size to render the compound oil-soluble and at least one non-metallic polar portion which when attached to the hydrocarbon portion provides a substantial part, often essentially all, of the detergent action.

To illustrate, specific examples of ashless detergents suitable for use as solid particles stabilizers include polyamine-polyalkylene alkenyl succinimides, long chain polyamines, dihydrocarbon substituted polyamines, substituted-phenol substituted polyamine products and mixtures thereof. These compounds may be represented by the following structures:

Polyamine-Polyalkylene Alkenyl Succinimides

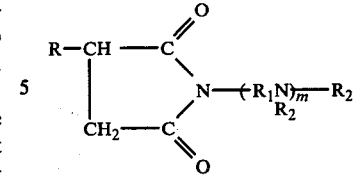

Long Chain Polyamines

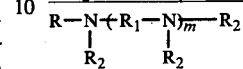

Dihydrocarbon Substituted Polyamines

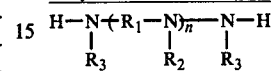

Substituted Phenol-Substituted Polyamine Products

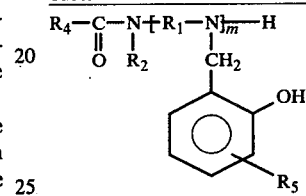

wherein R is a substantially hydrocarbon monovalent radical containing from about 30 to about 250 carbon atoms; each $R_1$ is an independently selected substantially hydrocarbon divalent radical containing from 1 to about 8 carbon atoms; each $R_2$ is independently selected from the group consisting of H and substantially hydrocarbon monovalent radicals containing from 1 to about 8 carbon atoms; each $R_2$ is an independently selected substantially hydrocarbon monovalent radical containing from about 15 to about 100 carbon atoms; $R_4$ is substantially hydrocarbon monovalent radical containing from 2 to about 30 carbon atoms; each $R_5$ is an independently selected substantially hydrocarbon monovalent radical containing from about 4 to about 30 carbon atoms; m is an integer from 1 to about 10, preferably from 2 to about 10, and n is an integer from zero to about 10, preferably from about 2 to about 6.

It is preferred that R and $R_3$ be alkenyl, preferably selected from the group consisting of polypropenyl and polyisobutenyl. It is preferred that each $R_1$ be an independently selected alkylene radical containing from 1 to about 8, more preferably from 2 to about 6, carbon atoms. Suitable alkylene radicals from which each $R_1$ may be independently selected include methylene, ethylene, propylene, butylene, hexylene, octylene and the like. Although each $R_1$ may be independently selected, it is preferred that for any given ashless detergent all the $R_1$'s contained therein are the same radicals.

The substantially hydrocarbon monovalent radicals from which each $R_2$ may be independently selected each contain from 1 to about 8, preferably from 1 to about 4, carbon atoms. These substantially hydrocarbon radicals include alkyl, such as methyl, ethyl, propyl, butyl, hexyl, octyl and the like, alkenyl, such as ethenyl, propenyl, butenyl, hexenyl, octenyl and the like; aryl, alkaryl, aralkyl, alkenaryl and aralkenyl, such as phenyl, methyl phenyl, phenyl ethyl, ethenyl phenyl, phenyl ethenyl and the like.

The substantially hydrocarbon radicals from which $R_4$ is selected contain from 2 to about 30, preferably from about 4 to about 24, carbon atoms. These radicals may be straight chain or branched, saturated or unsaturated, aliphatic (including cycloaliphatic), aromatic or combinations thereof. Examples of suitable radicals include alkyl such as butyl, octyl, decyl, dodecyl, octadecyl, $C_{24}$ alkyl and the like; alkenyl such as butenyl, octenyl, dodecenyl, octydecenyl, $C_{24}$ alkenyl and the like; and aryl, alkaryl, aralkyl, alkenaryl, aralkenyl such as phenyl, benzyl, naphthyl, ethyl phenyl, decyl phenyl, octadecyl phenyl, phenyl butyl, phenyl decyl, phenyl octadecyl, butenyl phenyl, decenyl phenyl, octadecenyl phenyl, phenyl butenyl, phenyl decenyl, phenyl octadecenyl and the like. More preferably, $R_4$ is selected from the group consisting of alkyl and alkenyl containing from about 10 to about 24 carbon atoms.

Each $R_5$ is preferably independently selected from alkyl radicals containing from 4 to about 30, preferably from about 8 to about 20, carbon atoms. Examples of radicals from which each $R_5$ may be independently selected include amyl, octyl, decyl, octadecyl and the like. The

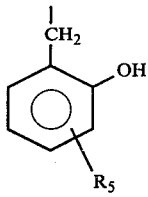

portion of the substituted phenol substituted polyamine acid salts may be replaced by, for example, alkylnaphthols and similar derivatives of biphenyl, terphenyl, phenanthrene, anthracene and the like.

The term "substantially" hydrocarbon radicals referred to herein includes those radicals which are composed primarily of carbon and hydrogen and also includes radicals which contain, in addition, minor amounts of substituents, such as oxygen, halide, sulfur, nitrogen and the like which do not substantially affect the hydrocarbon character of the radicals.

The specific ashless detergents noted above, as well as other of the many suitable ashless detergent materials and methods for preparing these materials are described in the following U.S. Pat. Nos.: 3,236,614; 3,018,247; 3,513,093; 3,753,670; 3,008,993; 3,275,554; 3,573,011; 3,574,576; 3,576,743; 3,578,422; 3,597,174; 3,639,110; 3,652,240; 3,655,351; 3,658,494; 3,658,495; 3,676,089; 3,701,640, 3,711,255; 3,717,447; 3,728,091; 3,746,520; 3,751,255; 3,756,793; 3,762,889; 3,764,281; 3,765,850; 3,773,479; 3,752,657; 3,753,670, 3,779,724 and 3,782,912.

One particularly preferred detergents or use in solid particles suspension component are co-polymers derived from the polymerization of (1) a N-vinyl pyrrolidone and (2) a oil soluble acrylic ester. As noted previously, such co-polymers can also be used in the presently useful polymer-solid particles compsosition. These co-polymers preferably have molecular weights in the range of about 75,000 to about 1,500,000, more preferably, about 200,000 to about 1,000,000, and still more preferably about 700,000 to about 1,000,000. The molar ratio of N-vinyl pyrrolidone to oil-soluble acrylic ester in such co-polymers is preferably in the range of about 1:4 to about 1:20, more preferably about 1:5 to about 1:15. In one preferred embodiment, the co-polymer is a graft copolymer in which the N-vinyl pyrrolidone is grafted onto an oil soluble polymeric backbone prepared from at least one oil-soluble acrylic ester.

N-vinyl pyrrolidones that may be used in the co-polymers useful in the composition of this invention may be represented by the structural formula:

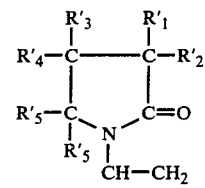

wherein $R'_1$, $R'_2$, $R'_3$, $R'_4$, $R'_5$ and $R'_6$ are independently selected from the group consisting of hydrogen and lower alkyl. Preferred lower alkyl groups contain from 1 to 4 carbon atoms. Preferably, each of the $R'_5$ is hydrogen.

Representative N-vinyl pyrrolidones within the scope of the above formula that are useful include N-vinyl pyrrolidone itself, 3-methyl-1-vinyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 4,5-dimethyl-1-vinyl pyrrolidone, 5,5-dimethyl-1-vinyl pyrrolidone, 3,3,5-trimethyl-1-vinyl pyrrolidone, 4-ethyl-1-vinyl pyrrolidone, 5-methyl-5-ethyl-1-vinyl pyrrolidone, 3,4,5-trimethyl-3-ethyl-1-vinyl pyrrolidone and other lower alkyl substituted N-vinyl pyrrolidones.

Also, within the scope of this invention are other cyclic N-vinyl amides such as N-vinyl caprolactam and its alkyl-substituted derivatives that may be included in the presently useful co-polymers, e.g., co-grafted onto the oil-soluble polymeric backbone.

The other essential monomer of the presently useful co-polymers is a material selected from alkyl acrylates, alkyl methacrylates or mixtures thereof with alkyl groups of sufficient average size to ensure solubility of the co-polymer, e.g., graft co-polymer, in the present lubricating oil composition. Oil-soluble acrylic esters useful as monomers, e.g., for forming the backbone polymer in the case of graft co-polymers, may be represented by the formula

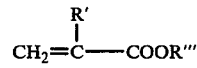

wherein R' represents hydrogen or methyl and R''' represents an oil solubilizing group, such as a substantially hydrocarbon radical containing about 8 to about 24 carbon atoms, especially an alkyl group of about 8 to about 24 carbon atoms. The alkyl group may be a straight chain or branched chain and preferably contains about 12 to about 18 carbon atoms. Representative acrylic and methacrylic esters that promote oil solubility comprise octyl, decyl, isodecyl, dodecyl, isododecyl, myristyl, cetyl, stearyl, eicosyl and tetracosyl acrylates and methacrylates.

The term "acrylic ester" in this invention includes both acrylates and methacrylates. Mixtures of both alkyl acrylates and alkyl methacrylates may be used.

In one preferred embodiment, lower alkyl acrylic esters, i.e., esters having alkyl groups smaller than about 8 carbon atoms and derived from acrylic or methacrylic acid, are used to replace a portion of the esters which have an oil solubilizing group. In general, they possess polymerizing characteristics similar to the acrylic esters which supply oil-solubility. Also, the presence of small alkyl groups in co-polymers may help improve such properties as pour point depression and viscosity index improvement. Typical lower acrylic esters are methyl, ethyl, propyl, butyl, amyl, and hexyl acrylates and methacrylates. These lower alkyl acrylic esters may be employed in amounts up to about 65% by weight of the total acrylates and/or methacrylates in the presently useful co-polymers.

In addition to the one or more of the above acrylic esters possessing oil-solubilizing groups and the aforementioned lower alkyl acrylic esters, there may be used to form the co-polymers, e.g., the backbone of the presently useful graft co-polymers, in minor amounts, one or more other miscellaneous free radically polymerizable monoethylentically unsaturated compounds, particularly monovinylidene compounds, i.e., those having one $CH_2=C<$ group. These include substantially hydrocarbon, e.g., alkyl, esters of maleic, fumaric, and itaconic acids (including half esters thereof), acrylic acid, methacrylic acids, maleic anhydride, acrylic amides, maleic half amides, acrylonitrile, methacrylonitrile, vinyl alkyl ethers, vinyl alkyl thioethers, styrene, alkylstyrenes, and lower alkyl acrylic esters.

The substantially hydrocarbon groups in these other esters and in the ethers may be small or large. For example, alkyl groups containing 1 to about 20 carbon atoms, e.g., methyl, butyl, octyl, nonyl, and dodecyl to octadecyl and mixtures thereof, may be employed. Half esters of dicarboxylic acids are of interest in supplying both the ester function and the acid function, which is often desired and which can be converted to a salt form, as with barium, strontium, calcium, or magnesium. Such miscellaneous co-monomers are used in minor proportions and in amounts which do not interfere with oil-solubility of the final co-polymer. Of course, those having larger hydrocarbon groups may also assist in imparting oil-solubility.

In a similar way, there may be used in minor proportion polymerizable esters in which in place of an alkyl group, there may be used a cyclic-containing residue of an alcohol or ester-forming equivalent, typical whereof are phenyl, alkylphenyl, benzyl, cyclohexyl, alkylcyclohexyl, cyclopentyl, and dicyclopentyl. Similarly, the alcohol residue used for forming a polymerizable ester or ether may contain a heteroatom, such as oxygen, sulfur, nitrogen, halogen, phosphorus and the like. Typical of these groups are methoxyethyl, ethoxyethyl, methylthiomethyl, butoxyethyl, ethoxypropyl, methylthioethyl, chloropropyl, 4-chlorobutyl, butyoxybutyl, phenoxyethyl, octylphenoxyethyl in which there are up to about 30 or more ether groups, cyclohexoxypropyl, benzoxyethyl, dodecylthioethoxyethyl, 2-(ethylsulfinyl) ethyl, butylsulfinylethyl, phenylsulfinylmethyl, dimethylaminoethyl, dibutylaminoethyl, tert-butylaminoethyl, dimethylaminoethoxyethyl, diethylphosphatoethyl, or diethylphosphonomethyl.

Typical vinyl ethers are vinyl butyl ether, vinyl octyl ether, vinyl dodecyl ether, vinyl hydroxyethyl thioether, and vinyl tetradecyl thioether. In place of vinyl alkyl ethers there may be used vinyl ethers having a ring substituent as in vinyl phenyl ether, vinyl benzyl ether, or vinyl cyclohexyl ether.

Polymerizable amides of chief interest are acrylamide, methacrylamide, and their N-substituted derivatives, including such compounds as N-methyl, N-dimethyl, N-octyl, N-dodecyl, N-cyclohexyl, N-phenyl, N-methyl-N-benzyl, N-butoxymethyl, N-(dimethylaminoethyl), or N-B-cyanoethyl acrylamide or methacrylamides.

Up to about 25% based on the weight of the final co-polymer of such miscellaneous monomer or monomers may be used, if desired, but such use is optional.

To prepare the presently useful graft co-polymers, the backbone polymer, which may be formed using conventional techniques well known in the art, containing at least one acrylic and/or methacrylic ester supplying oil-solubility, with or without other polymerizable monoethylenically unsaturated compounds, is treated with a free radical polymerization initiator. This initiator may be, for example, an organic peroxide or hydroperoxide or an azo catalyst. An especially effective initiator system comprises an organic hydroperoxide coupled with a quaternary ammonium compound as activator. Graft polymerization may be effected in bulk or in an organic solvent, especially in an organic solvent in which polymers are soluble. Use of such solvent decreases viscosity of the mixture and permits a more efficient polymerization reaction.

Among solvents which may desirably be used are aromatic hydrocarbons, such as benzene, toluene, xylene, and aromatic naphthas, chlorinated hydrocarbons such as ethylene dichloride, esters such as ethyl propionate or butyl acetate, and also petroleum oils which are pure enough so as not to interfere with the polymerization. Solvent may be retained with the final polymer or it may be removed therefrom. The final co-polymer in solvent may be mixed with a good quality mineral oil, such as 100 to 150 neutral oil, or with a synthetic lubricant and the volatile solvent evaporated from the mixture to give a solution of co-polymer in oil or synthetic lubricant, such as dioctyl sebacate, dibutylphenyl phosphate, a silicate ester, or a silicone fluid.

The N-vinyl pyrrolidone monomer is heated with initiator in the presence of the backbone polymer to a polymerizing temperature, preferably between about 60° C. and about 225° C. Choice of temperature or range of temperature depends in part upon the initiator system to be used and upon such other factors as choice of monomer, solvent, and concentrations. Graft polymerization may be initiated at one temperature and continued at other temperatures. Initiator or initiator and activator may be added in portions. Different polymerization initiators may be used at different stages of polymerization during which solvent may be supplied or removed.

As initiator there is preferably used an organic hydroperoxide such as tert-butyl hydroperoxide, cumene hydroperoxide, diisopropylbenzene hydroperoxide, p-methane hydroperoxide, pinane hydroperoxide, 2,5-dimethylhexane-2, 5-dihydroperoxide, or other tert-alkyl hydroperoxides, hydrocarbon-substituted benzene hydroperoxides, or terpene hydroperoxide. The initiator may be supplied as a single charge or added in portions as polymerization progresses.

Hydroperoxides become active as initiators at lower temperatures when used in conjunction with an activator. Especially useful activators are quaternary ammonium compounds, such as benzyltrimethylammonium chloride, dibenzyldimethylammonium bromide, butyldimethylbenzylammonium chloride, cetyltrimethylammonium chloride, dodecyldimethylbenzylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, nonylphenoxyethoxyethyltrimethylammonium chloride, diisobutylphenoxyethoxyethyldimethylbenzylammonium chloride, cetylpyridinium bromide, N-octyl-N-methylmorpholinium chloride, and bis-quarternary ammonium salts, such as those having quaternary nitrogens linked with an alkylene chain, an amide-containing chain, or an ether-containing chain.

In place of a hydroperoxide or a hydroperoxide-activator system there may be used other free radical polymerization initiators. These include peroxides such as benzoyl peroxide, acetyl peroxide, caproyl peroxide, lauroyl peroxide, di-tert-butyl perphthalate, tert-butyl perbenzoate, 2,2-bis (tert-butyl-peroxy) butane, or methyl ethyl ketone peroxide. There may likewise be used an azo catalyst such as azodiisobutydimethyl azodiisobutylate, azobis (a-ethylbutylnitrile), or azobis (a,B-dimethylcapronitrile). The amount of initiator or initiators is preferably between about 0.01% and about 5% of the weight of monomers used.

In the embodiment which involves a solid particles-containing suspension, the present device, e.g., filtering apparatus, preferably further comprises means associated with the chamber to prevent the suspension from leaving the device prior to the device being connected to the internal combustion engine. For example, such means may involve a liquid-proof seal situated so as to rupture as the device is connected to the engine. Alternately, such means may involve a covering which substantially encapsulates the suspension. At least a portion, and preferably all, of this covering comprises material which is rapidly solubilizied or dispersed in the circulating oil system. Of course, the presently useful seal and covering should be made of material or materials which have no substantial deleterious effect on the present apparatus, the circulating oil or the engine. For example, such seal and covering may comprise solid (at ordinary ambient temperatures), substantially organic polymeric material.

The polymer-solid-particles-containing composition and the solid particles suspension can contain other additives which would be of value if released to the oil circulation system. For instance, a quality crankcase lubricant contains a variety of additives. For example, detergent additives such as the calcium sulfonates, calcium phenates, calcium phosphenates, derivatives of alkenyl succinimides and the like may be admixed with the polymer composition and suspension. Suitable oxidation inhibitors that can be added include the zinc dithiophosphates, zinc dithiocarbamates, hindered phenols, aromatic amines, etc. Extreme pressure and oiliness additives such as sulfur-metal naphthenates, phosphate esters, and sulfurized hydrocarbons, etc. may also be admixed with the polymer. The polymer-solid particles-containing composition and suspension may also contain alkaline agents such as overbased calcium sulfonates or colloidal inorganic salts such as calcium carbonates, calcium hydroxide, etc. "Multi-purpose oil additives", such as the sulfurized calcium phenates and polyolefin substituted succinimides, also may be used. The above list is not meant to be all-inclusive, but is merely exemplary of some of the types and kinds of additional additives that can be used.

These and other aspects and advantages of the present invention are set forth in the following detailed description and claims, particularly when considered in conjunction with the accompanying drawings in which like parts bear like reference numerals. In the drawings:

Figure 1:
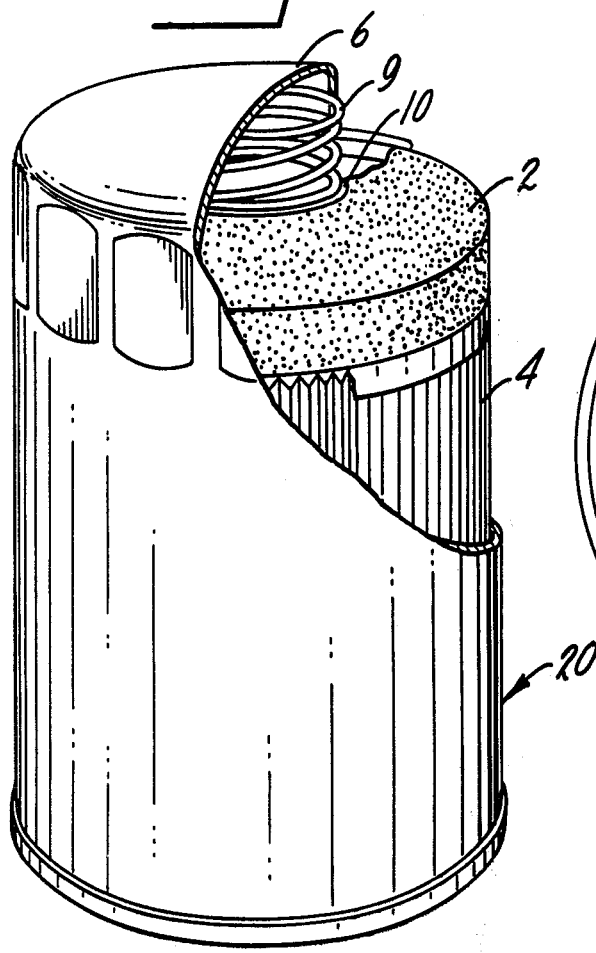
FIG. 1 is a frontal view, partly in section, of an oil filter apparatus according to the present invention.
Figure 2:
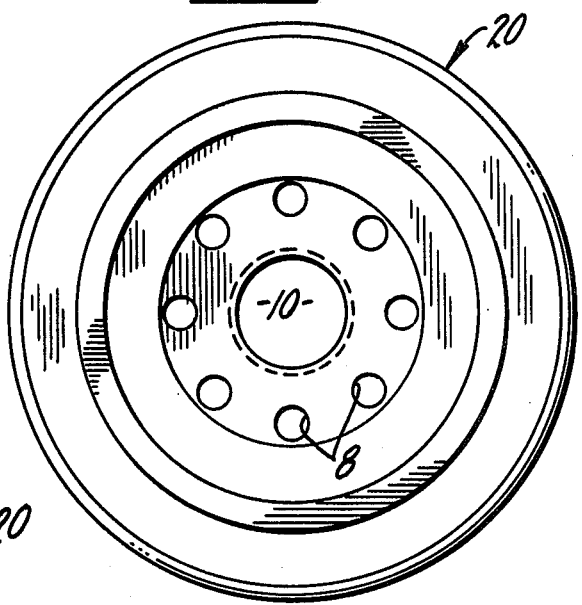
FIG. 2 is a bottom view of the oil filter apparatus shown in FIG. 1.

FIGS. 1 and 2 show an oil filter, referred to generally as 20, which includes disc 2 placed on the top of filter element 4 in the oil filter outer shell 6. Disc 2 is made of polymer-solid particles composition as is described above. In operation, the oil to be filtered enters through one or more periferial inlet conduits 8, at the base of the oil filter 20 and contacts disc 2. The oil passes through the filter element 4 and exits through a center outlet conduit 10 in the base of the oil filter 20. The filter element 4 and disc 2 can be maintained in place by bias spring 9 and retainer cup 10. The composition, location and shape of disc 2 and the spacing through which the oil flows and contacts disc 2 can control the rate of dissolution or dispersion of the polymer of the polymer-solid particles composition. In a preferred embodiment of this invention, illustrated in FIG. 3, combination disc 22 replaces disc 2. Combination disc 22 involves first layer 24 and second layer 26. First layer 24 contains a polymer which is more rapidly dispersed into the circulating oil and/or a greater concentration of solid particles relative to the polymer and solid particles concentration present in second layer 26. Thus, first layer 24 is contacted predominantly with the oil first, in order that the solid particles level in the oil can be increased at a higher rate. As first layer 24 is consumed, second layer 26 is contacted with the circulating oil to release additional solid particles in order to maintain the solid particles level in the lubricating oil.

Figure 4:
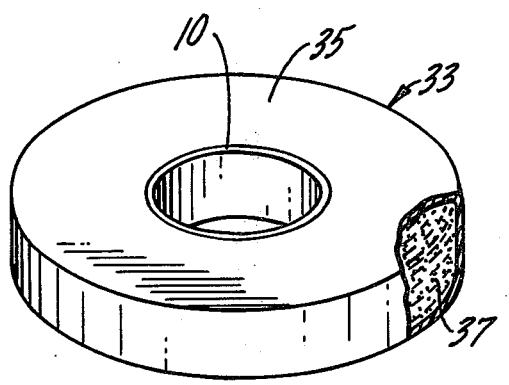
FIG. 4 is a view of an additional embodiment of a solid particles-containing means according to the present invention.

In an additional preferred embodiment, illustrated in FIG. 4, coated disc 33 replaces at least a portion of disc 2. Coated disc 33 involves coating 35 which encapsulates liquid solid particles suspension 37. Coating 35 is made of, for example, polypropylene, which will rapidly dissolve or disperse into the circulating oil, thus releasing the liquid solid particles suspension into the circulating oil. Such coating may have widely varying thickness, for example, in the range of about 0.00005 in. to about 0.05 in., preferably about 0.00005 in. to about 0.01 in.

In a still further preferred embodiment, first layer 24 of combination disc 22 is replaced by coated disc 33. In this embodiment, the solid particles in coated disc 33 are rapidly added to the circulating oil and, thereafter, the solid particles concentration in this oil is substantially maintained by the addition of solid-particles through the relatively slow dissolution of second layer 26.

The choice of which embodiment of the present oil filter apparatus to use depends on the particular application involved. For example, if the engine with which the oil filter apparatus is to be associated is being lubricated by a solid particles-containing lubricating composition, the embodiment shown in FIG. 1, with disc 2, may be preferred in order to maintain a proper or desired solid particles concentration in the circulating oil. However, the present invention may advantageously be used when the engine is lubricated by an oil which originally contained no solid particles. In this application, disc 2 is preferably replaced by either combination disc 22 or coated disc 33 to rapidly add solid particles to the circulating oil.

The following examples clearly illustrate the present invention. However, these examples are not to be interpreted as specific limitations on the invention.

EXAMPLE 1

A polymer-graphite composition is prepared as follows. The graphite is available in a mineral oil-based dispersion containing about 10% by weight of solid graphite particles which have an average (by weight) particle size of about 200 millimicrons. The dispersion also includes about 6% by weight of a nitrogen and methacrylate-containing dispersant derived from a methacrylic ester containing about 16 carbon atoms per molecule. Approximately 100 grams of this dispersion is compounded with a solid methacylate ester-N-vinyl pyrrolidone copolymer to provide a total of 140 grams of polymer-solid-particles composition. The copolymer is derived from a methacrylic ester containing from about 16 carbon atoms per molecule and is prepared using conventional techniques. This copolymer has an average molecular weight of about 800,000 and a molar ratio of N-vinyl pyrrolidone to methacrylate ester of about 1:10.

The polymer-solid particles-composition in the form of a disc is incorporated into a lubricating oil filter of the type described in FIGS. 1 and 2 and placed in actual service in a lubricating oil system of an internal combustion engine having a lubricating oil capacity or inventory of 5 quarts and operating with unleaded fuel. The lubricating oil used in this engine originally includes about 1.0% by weight of graphite particles. Under engine operating conditions, the polymer and particles are slowly released into the circulating oil system. During such operation, the graphite concentration of the circulating lubricating oil is sufficient to provide beneficial lubricating results.

EXAMPLE 2

Example 1 is repeated except as follows. The mineral oil-base dispersion contained about 20% by weight of the solid graphite particles and the dispersion also contained about 12% of the dispersant as set forth in Example 1. The lubricating oil, as originally placed in the engine, contained essentially no graphite particles. Under engine operating conditions, the polymer and graphite particles are slowly released into the circulating lubricating oil system. Over a period of time, improved lubrication benefits are achieved.

EXAMPLE 3

Figure 3:
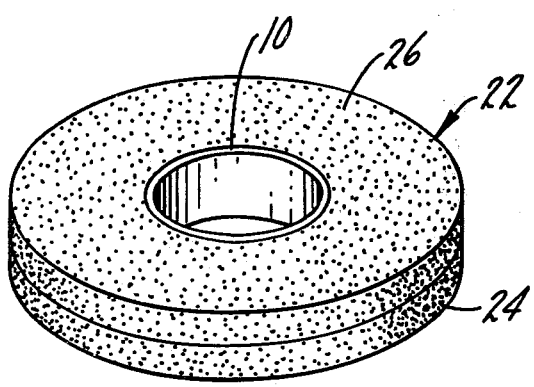
FIG. 3 is a view of one embodiment of the solid particles-containing means according to the present invention.

Example 1 is repeated except as follows. A combination disc, as illustrated in FIG. 3, comprising a lower layer of the polymer-graphite composition used in Example 2 (weighing about 100 grams) and an upper level of the polymer-graphite composition used in Example 1 (weighing about 80 grams). The oil used in the engine originally contained essentially no graphite particles. Under engine operating conditions, the polymer and graphite particles present in the combination disc are released into the circulating oil system to provide improved lubricating benefits.

EXAMPLE 4

Example 1 is repeated except as follows. The polymer-graphite composition is replaced by a graphite suspension encapsulated in a thin polypropylene film. About 140 grams of the suspension is used. The suspension is a mineral oil based dispersion containing about 20% by weight of solid graphite particles (by weight) having an average particle size of about 200 millimicrons and also includes about 12% by weight of the nitrogen and methacrylate-containing dispersant described previously. The lubricating oil used in the engine originally contained essentially no graphite particles. Under engine operating conditions, the polypropylene film is quickly ruptured to rapidly release the graphite suspension into the circulating lubricating oil to provide improved lubricating benefits.

EXAMPLES 5, 6 and 7

Examples 1, 2 and 3 are repeated except that the solid methacrylate ester-N-Vinyl pyrrolidone copolymer is replaced by a conventional solid polyisobutylene having a molecular weight of about 100,000.

EXAMPLES 8, 9 and 10

Examples 1, 2 and 3 are repeated except that the solid methacrylate ester-N-Vinyl pyrrolidone copolymer is replaced by a conventional solid ethylene-propylene copolymer having a molecular weight of about 250,000.

While this invention has been described with respect to various specific examples and embodiments, it is to be understood that the invention is not limited thereto and that it can be variously practiced within the scope of the following claims.

The embodiments of the invention in which an exclusive property or privilege is claimed and defined as follows.

1. A method for at least maintaining the lubricating quality of a circulating lubricating oil composition in an internal combustion engine having a filter means comprising contacting at least a portion of said circulating oil with a material selected from the group consisting of (1) a solid thermoplastic polymer having a controlled rate of dissolution in said oil composition, said polymer having solid particles effective to at least maintain the lubricating quality of said oil composition, (2) a liquid suspension containing such solid particles and mixtures thereof, thereby adding solid particles to said circulating lubricating oil composition, said solid particles being sized sufficiently small to substantially avoid being removed from the lubricating oil composition by said filter means used to remove solid contaminants from the composition, and being of graphite.

2. The method of claim 1 wherein said thermoplastic polymer is selected from the group consisting of polyolefinic materials, polymethacrylates, polyalkyl methacrylates wherein the alkyl group contains 1 to about 20 carbon atoms, copolymers of alkylmethacrylate and vinyl pyridine, copolymers of (1) a N-Vinyl pyrrolidone and (2) an oil soluble acrylic ester and mixtures thereof.

3. The method of claim 2 wherein at least a portion of said lubricating oil is contacted with said solid thermoplastic polymer containing said solid particles.

4. The method of claim 3 wherein said polymer is selected from the group consisting of copolymers of alkyl methacrylate and vinyl pyridine, and copolymers of (1) a N-Vinyl pyrrolidone and (2) an oil soluble acrylic ester and mixtures thereof and said solid particles are selected from the group consisting of graphite, molybdenum disulfide and mixtures thereof.

5. The method of claim 4 wherein said polymer is a copolymer of (1) a N-Vinyl pyrrolidone and (2) an oil soluble acrylic ester, said copolymer having a molecular weight in the range of about 75,000 to about 1,500,000 and said solid particles are graphite.

* * * * *